(12) United States Patent
Liu et al.

(10) Patent No.: US 8,744,165 B2
(45) Date of Patent: Jun. 3, 2014

(54) METHOD AND APPARATUS FOR STAIN SEPARATION IN DIGITAL PATHOLOGY IMAGES

(75) Inventors: Ming-Chang Liu, San Jose, CA (US); Mark Robertson, Cupertino, CA (US)

(73) Assignee: Sony Corporation, Tokyo (JP)

( * ) Notice: Subject to any disclaimer, the term of this patent is extended or adjusted under 35 U.S.C. 154(b) by 105 days.

(21) Appl. No.: 13/553,448

(22) Filed: Jul. 19, 2012

(65) Prior Publication Data

US 2014/0023259 A1 Jan. 23, 2014

(51) Int. Cl.
*G06K 9/00* (2006.01)
*G01N 33/48* (2006.01)
*G01N 33/50* (2006.01)
*A61K 49/00* (2006.01)

(52) U.S. Cl.
USPC ............... 382/133; 382/134; 702/19; 702/21; 424/9.1

(58) Field of Classification Search
USPC ................. 382/128–134; 702/19, 21; 424/9.1
See application file for complete search history.

(56) References Cited

U.S. PATENT DOCUMENTS

| | | | | |
|---|---|---|---|---|
| 7,246,012 | B2 * | 7/2007 | Kutsyy et al. | 702/19 |
| 8,023,708 | B2 * | 9/2011 | Dewaele et al. | 382/128 |
| 2005/0136549 | A1 | 6/2005 | Gholap et al. | |
| 2008/0205737 | A1 * | 8/2008 | Kunze et al. | 382/131 |
| 2010/0329535 | A1 | 12/2010 | Macenko et al. | |

OTHER PUBLICATIONS

"Quantification of Histochemical Staining by Color Deconvolution", Arnout C.Ruifrok, and Dennis A. Johnston, Departments of Pathology and Biomathematics, University of Texas, Anderson Cancer Center, Houston, TX, 21 pages, 2001.
"Unsupervised Color Decomposition of Histologically Stained Tissue Samples", A. Rabinovich, C.A. Laris, S. Agarwal, J.H. price, and S. Belongie, Department of Computer Science, University of California, San Diego, Proc. of NIPS, pp. 667-673, 2003.

* cited by examiner

*Primary Examiner* — Amir Alavi
*Assistant Examiner* — Kenny Cese
(74) *Attorney, Agent, or Firm* — Moser Taboada

(57) ABSTRACT

A stain separation system of digital pathology images that performs transforming a digital image from a first color domain to an optical domain to form an optical domain image (ODI), identifying a plane containing two or more basis vector which contain the pixels of the ODI, determining a plurality of orthogonal vector within the identified plane, forming a histogram of the digital image represented by the orthogonal vectors and determining one or more final stain vectors by searching for candidate vectors in the plane that minimize a cost function of the histogram.

20 Claims, 7 Drawing Sheets

METHOD AND APPARATUS FOR STAIN SEPARATION IN DIGITAL PATHOLOGY IMAGES

BACKGROUND

1. Field of the Invention

Embodiments of the present invention generally relate to pathology image analysis and, more particularly, to a method and apparatus for stain separation in digital pathology images.

2. Description of the Related Art

In the area of biology and medicine, understanding cells and their supporting structures in tissues, tracking their structure and distribution changes are very important. Histology, the study of the microscopic anatomy of tissues, is essential in disease diagnosis, medicinal development and many other fields. In histology, the process of examining a thin slice of tissue sample under a light microscope or electron microscope is usually performed. In order to visualize and differentiate the microscopic structure, one common approach is to stain the tissue sample with a combination of several dyes that have selective responses to different biological substances. In doing so, specified biological substances such as nuclei, cytoplasm, membranes, other structures, and specific proteins are visually enhanced.

Multiple stained tissue slides (images) are generally used to find the co-occurrence and co-localization of different bio-markers. Traditionally, the stained histology images are visually checked by a trained pathologist. The screening is based on relative color difference and morphological features of the images. The process is slow and expensive. One proposed approach is hand-picking pure dye spectra. This approach is not ideal since the pure dye area may not exist or may be difficult to locate. A second approach uses non-negative matrix factorization, but is a computationally complex and infeasible method. A third approach is color analysis based, but does not account for stain color spectra overlap and leads to loss of stain co-localization information.

Therefore, there exists a need to provide a method and apparatus for improved stain separation in digital pathology images.

SUMMARY OF THE INVENTION

An apparatus and/or method for stain separation in digital pathology images, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained further below, various embodiments of the invention disclose a method and apparatus for stain separation in digital pathology images. In one embodiment, a digital pathology image is converted from its color domain to the optical density domain color mode using a logarithmic conversion operation. The optical density is a logarithmic ratio of the radiation falling upon a material, to the radiation transmitted through a material. The digital pathology image often is stained with various stains to differentiate between particular specimens. Converting to the optical density image is a preprocessing step used to isolate the effects of the various stains. Basis vectors are determined for colors represented in the optical domain image, and a plane is constructed from the basis vectors. Two orthogonal vectors are extracted from the plane and a histogram is formed of the original data represented by the orthogonal vectors, thereby reducing the quantity of data to process. The plane is then searched for candidate vectors with a minimized cost function, thus representing the final stain vectors. Once the stain vectors are known, stain amounts can be calculated using matrix operations with optical domain data representing the original image. The stain vectors and stain amounts are then used to form one or more stain images where each stain image represents an isolated stain to the original image.

Figure 1:
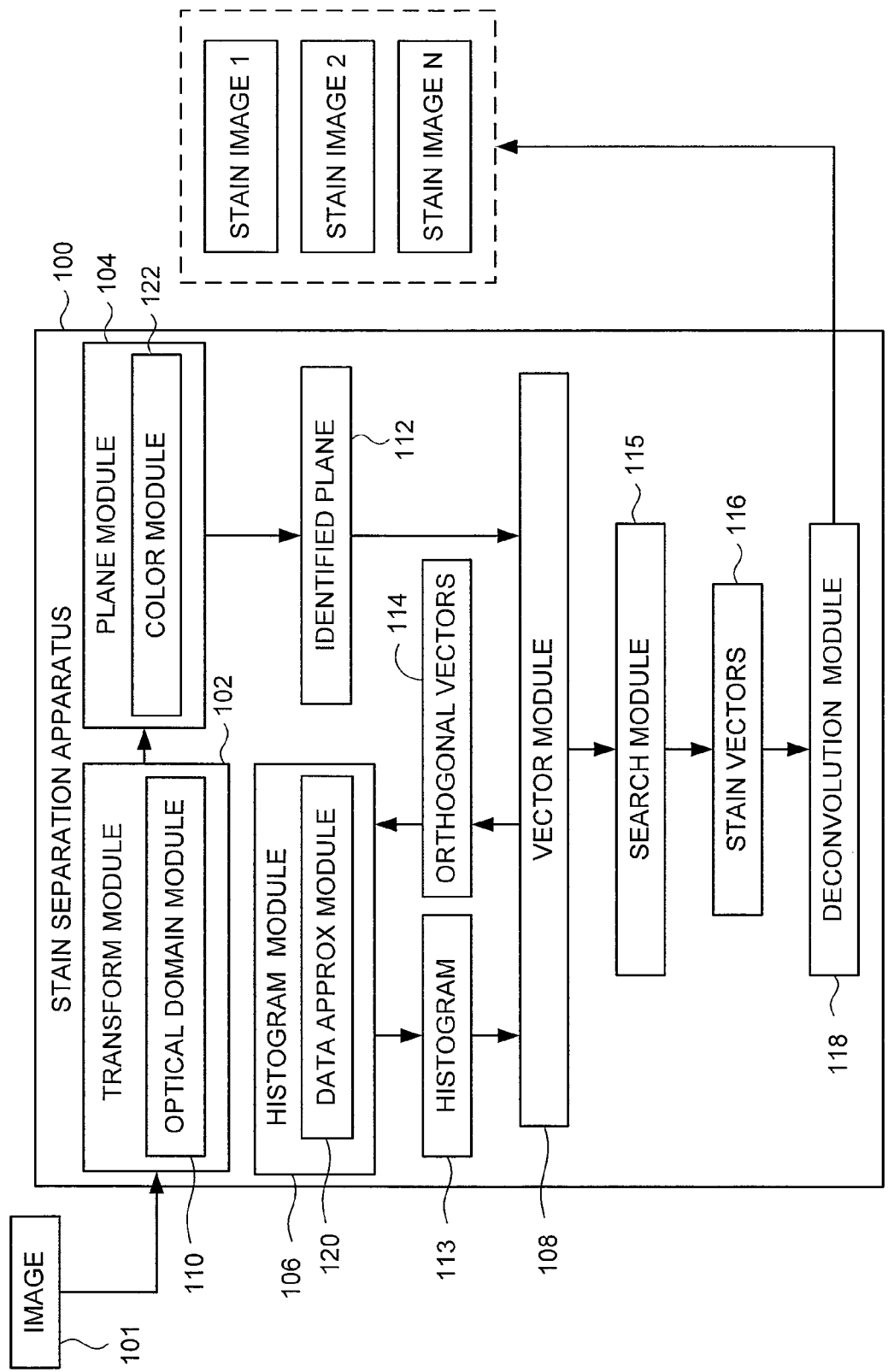
FIG. 1 is a functional block diagram depicting a stain separation apparatus in accordance with exemplary embodiments of the present invention.

FIG. 1 is a functional block diagram depicting a stain separation apparatus 100 in accordance with exemplary embodiments of the present invention. The stain separation apparatus 100 comprises a transform module 102, a plane module 104, a histogram module 106, a vector module 108 and a deconvolution module 118. An image 101 is, according to an exemplary embodiment, a digital image representation of a slide viewed in a microscope, e.g., a digital microscope. The image 101 may be treated with one or more stains in order to distinguish the specimens located in the image using various colors. According to this embodiment, the image 101 is a Red-Green-Blue (RGB) image meaning that every pixel in the image contains a value from 0 to 255 for each of R, G and B. According to other embodiments, the image 101 may have a different color mode such as CMYK, Y-Cb-Cr, multispectral color spaces, or any color mode.

The image 101 is coupled to the transform module 102. The transform module 102 comprises the optical domain module 110. The optical domain module 110 converts the image 101 to an optical domain image (ODI) using various mathematical operations and the like described in detail with reference to FIG. 2 below.

The ODI is then coupled to the plane module 104. The plane module 104 further comprises a color module 122. The plane module 104 uses the ODI image to identify a plane 112 which contains the data points in the ODI image, as described with respect to FIG. 2.

The identified plane determined by the plane module 104 is then coupled to the vector module 108 for determining orthogonal vectors 114 from the identified plane 112. The orthogonal vectors 114 are used by the histogram module 106 to form a histogram of the ODI image data points. The histogram module 106 comprises a data approximation module 120. The data approximation module 120 first approximates the ODI image data points where a vector $[R_{OD}(x,y), G_{OD}(x,y) B_{OD}(x,y)]$, representing each pixel of the ODI is approximately equal to $\hat{a}_1(x,y) v_a + \hat{a}_2(x,y) v_b$. Here, $a_1$ and $a_2$ represent, respectively, the stain amounts of stain 1 and stain 2 respective to the initial stain vectors $v_a$ and $v_b$. According to one embodiment of the present invention, the histogram module 106 forms a two-dimensional (2D) joint histogram $H(m, n)$, such that $H(m,n)$ represents the number of times that $a_1(x,y)=m$ and $a_2(x,y)=n$. In this embodiment, the histogram has 256×256 bins.

Figure 4:
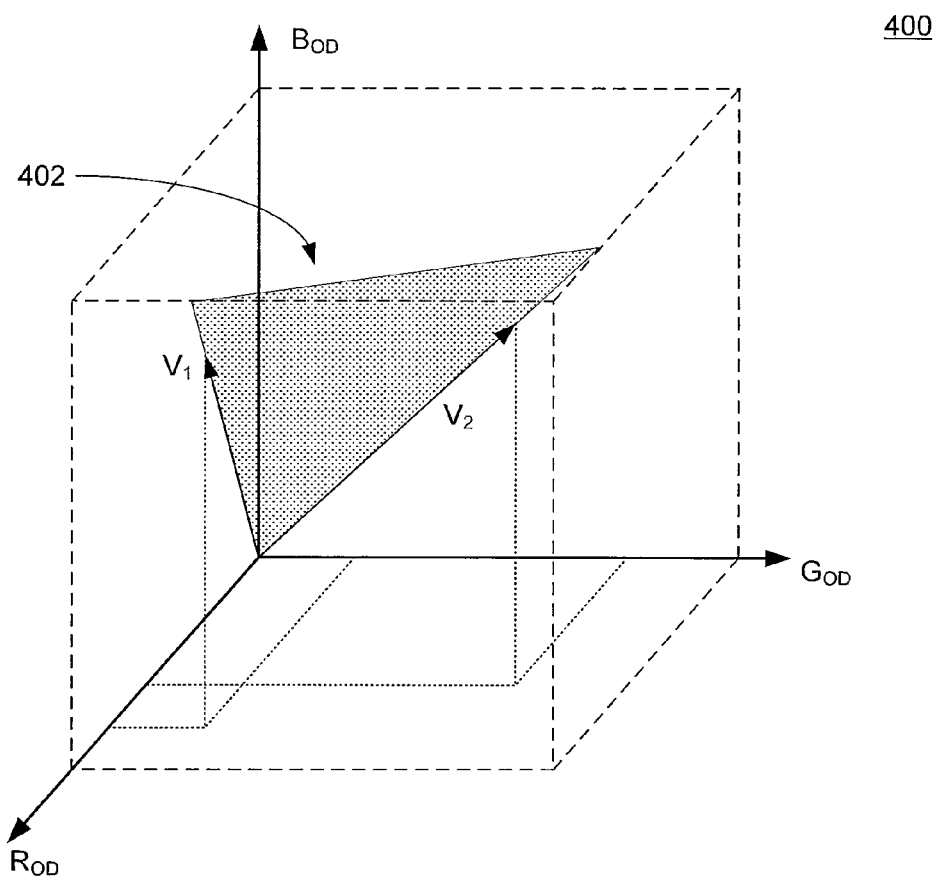
FIG. 4 is an illustration of basis vectors determined by the vector module in accordance with exemplary embodiments of the present invention.

The histogram 113 is a not a "tight" fit for the data wedge shown in FIG. 4, which represents the data points of the original image as plotted between two vectors, however, the plane formed by $v_a$ and $v_b$ is the desired plane. For efficiency, a list is created using the following pseudo-code:

```
k=0;
for each m,n
    if H(m,n)>0
        k=k+1;
        m_list[k] = m;
        n_list[k] = n;
        counts[k] = H(m,n);
    end if
end for
```

At the conclusion of this loop, k represents the number of unique colors within the $v_a$-$v_b$ representation. According to an exemplary embodiment, the original image is a 767×767 pixel image. If the histogram 113 contains only 8% of non-zero histogram bins, the data can be represented with $1/112^{th}$ the number of data points, for example.

The histogram 113 is transmitted to the vector module 108. The vector module 108 then determines the final stain vectors 116 using the histogram 113 as described below with reference to FIG. 3.

The deconvolution module 118 uses the stain vectors 116 to determine stain amounts, and form the corresponding stain images 1 . . . N. According to one embodiment, if the vector $[R_{OD}(x,y) G_{OD}(x,y) B_{OD}(x,y)]$ is known for each pixel of the ODI, the vector $[R_{OD}(x,y) G_{OD}(x,y) B_{OD}(x,y)]=a_1(x,y) v_1+a_2(x,y) v_2$, where $a_1$ and $a_2$ represent stain 1 and stain 2 contribution amounts at points x and y in the image, and $v_1$ and $v_2$ represents the color vector for stain 1 and stain 2, representing estimates of the actual stain vectors.

Generalized, for two stains, a color $p=a_1 v_1+a_2 v_2$. Due to noise and modeling limitations, the data will not all lie on the plane formed by $v_1$ and $v_2$. Hence, a third "residual" vector is added to account for off-plane data points: $v_3=v_1 \times v_2$ where "x" is the vector cross product, which gives a vector orthogonal to the plane formed by $v_1$ and $v_2$.

Finally, the expression $p=a_1 v_1+a_2 v_2+r v_3$ represents the color p, where r is the residual contribution. Using linear algebra, it is determined that:

$$\begin{bmatrix} a_1 \\ a_2 \\ r \end{bmatrix} = [v_1 \ v_2 \ v_3]^{-1} p.$$

This can be reduced to the expression:

$$p = a_1 v_1 + a_2 v_2 + r v_3 = [v_1 \ v_2 \ v_3] \begin{bmatrix} a_1 \\ a_2 \\ r \end{bmatrix}$$

Therefore, since the stain vectors $v_1$, $v_2$ and $v_3$ are known and the color p is known, the stain amounts $a_1$, $a_2$ and r are determined and used to form the stain images 1 . . . N by multiplying the stain vector with the color value. Once the stain amounts are known, the image for stain 1 is viewed as an RGB image in the optical density domain as $a_1(x,y)v_1$ and the image for stain 2 is viewed as an RGB image in the optical density domain as $a_2(x,y)v_2$. The optical density transform is then inverted and applied at each pixel to obtain the "normal" RGB value for each pixel. With each pixel's RGB value, the stain images are produced.

Figure 2:
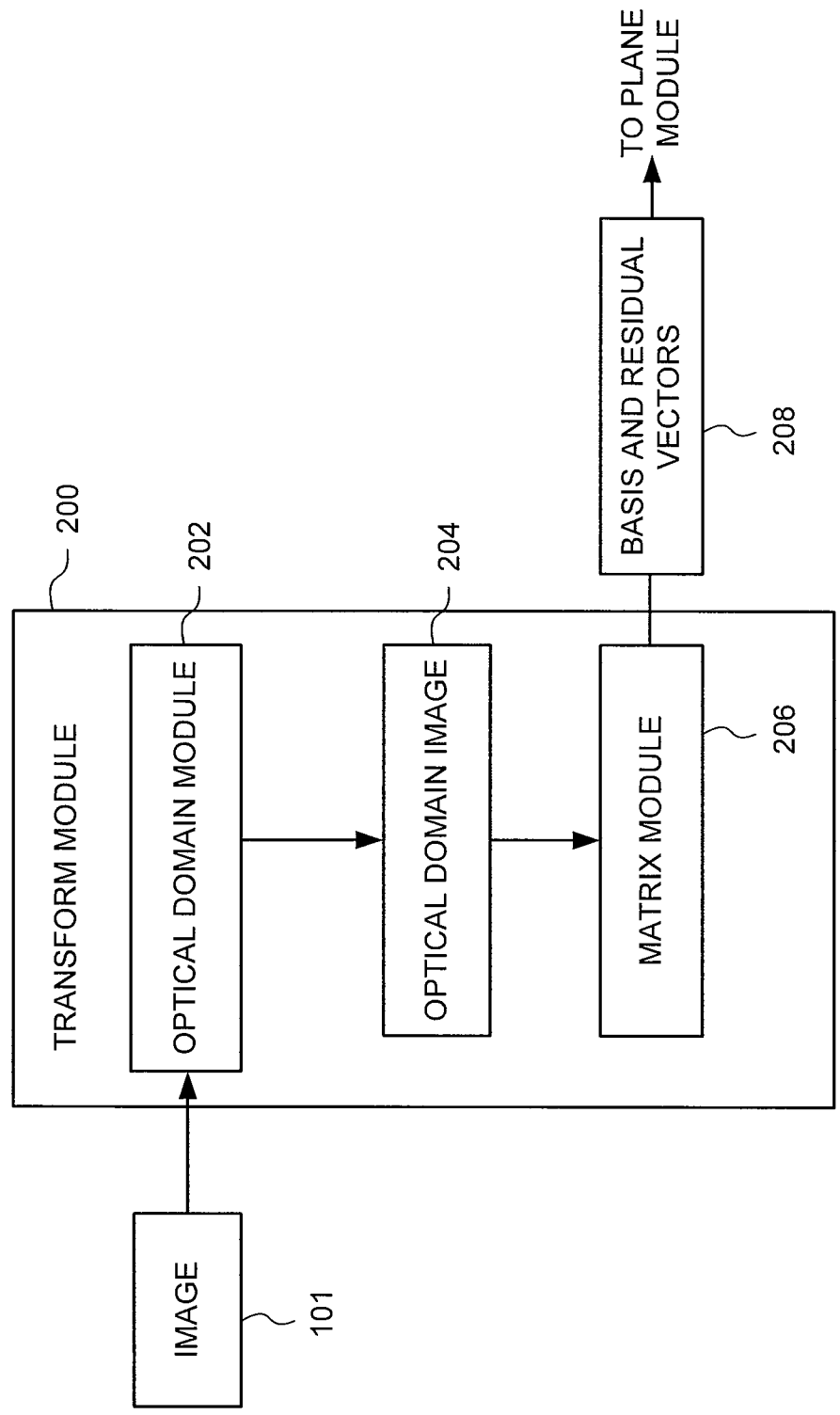
FIG. 2 is a functional block diagram depicting the transform module of the stain separation apparatus in accordance with exemplary embodiments of the present invention.

FIG. 2 is a functional block diagram depicting the transform module 200 of the stain separation apparatus 100 in accordance with exemplary embodiments of the present invention. The transform module 200 comprises the optical domain module 202 and the matrix module 206. The optical domain module 202 receives the image 101 as input. For an RGB image, an exemplary conversion from RGB to the optical domain is performed using the following formula: $R_{od}=-\log_{10}(R/R_0)$. A similar computation is performed for the Green and Blue optical domain values. $R_0$ is the white point in the image 101, where the background illumination is as close to 255, 255, 255 (RGB) as possible. These calculations are applied to each pixel of the image 101 producing the optical domain image (ODI) 204.

The matrix module 206 receives the ODI 204 as input. Each pixel of the ODI can be represented as a vector $[R_{OD}(x, y), G_{OD}(x,y) B_{OD}(x,y)]$, where $R_{OD}(x,y)$ represents the optical domain Red value at the x, y position in the ODI, $B_{OD}(x,y)$ represents the optical domain Blue value at the x, y position in the ODI and $G_{OD}(x,y)$ represents the optical domain Green value at the x, y position in the ODI.

According to one embodiment, the matrix module 206 performs Principal Component Analysis on the ODI vectors resulting in $v_a$ and $v_b$ the two strongest components. These vectors, $v_a$ and $v_b$ form the desired plane. For the purposes of the present invention, these vectors will be referred to as basis vectors for the identified plane 112. Another vector $v_c$, the weakest component, is determined to be the residual vector. According to other embodiments, the Karhunen-Loeve Transform (KLT) is used to determine $v_a$, $v_b$ and $v_c$. Those of ordinary skill in the art will appreciate that any appropriate method may be substituted in order to determine the strongest and weakest components for the data points in the ODI image.

In some situations, after applying the above-mentioned mathematical transformations, the determined basis vectors $v_a$ and $v_b$ may have negative components, which is undesirable for determining basis vectors. Therefore, according to one embodiment, the vectors are rotated, while staying within the same plane so that the sum of the squares of their negative components is minimized. The matrix module then returns the basis and residual vectors 208.

Figure 3:
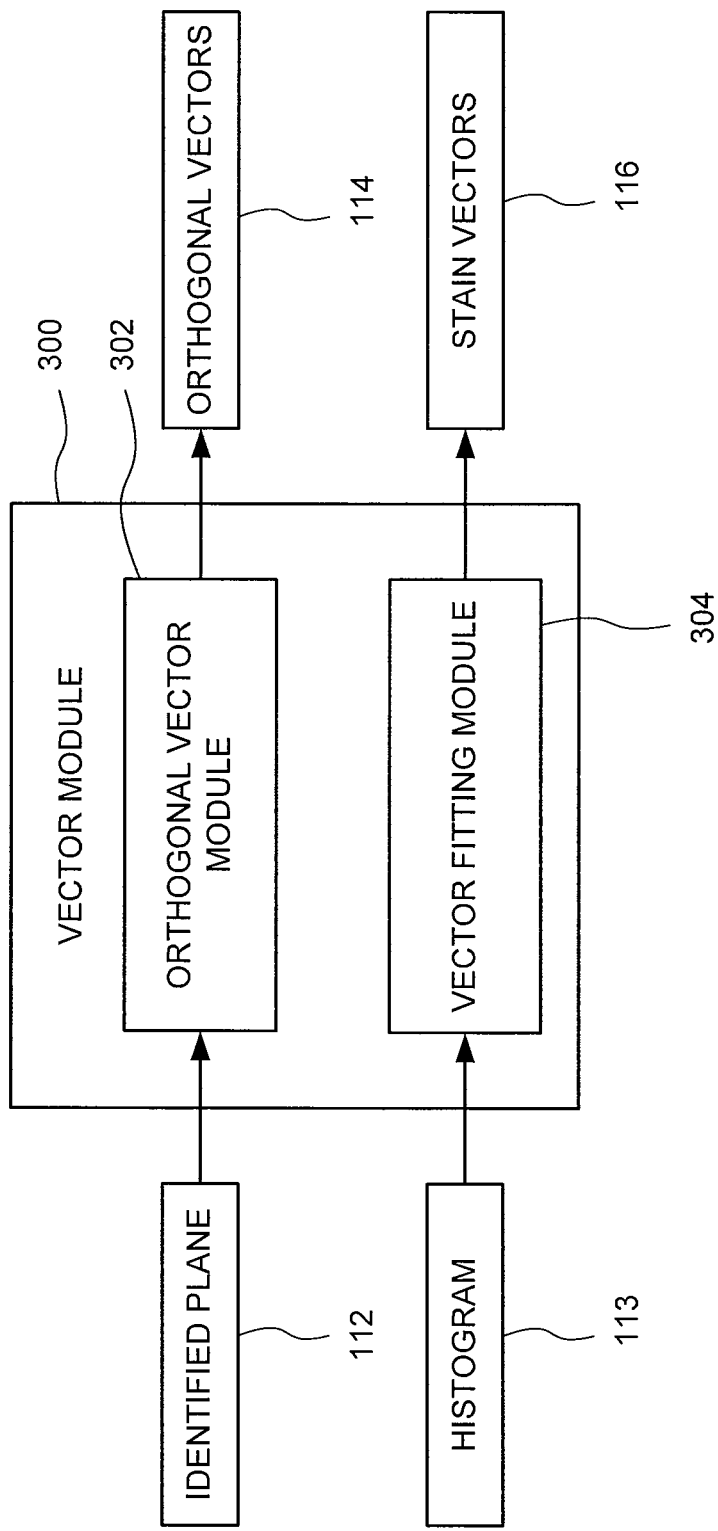
FIG. 3 is a functional block diagram depicting the vector module of the stain separation apparatus in accordance with exemplary embodiments of the present invention.

FIG. 3 is a functional block diagram depicting the vector module 300 of the stain separation apparatus 100 in accordance with exemplary embodiments of the present invention. The vector module 300 comprises an orthogonal vector module 302 and a vector fitting module 30. According to some embodiments, the orthogonal vector module 302 takes as input the identified plane 112 and returns a set of orthogonal vectors 114 within the identified plane 112. The orthogonal vectors 114 are, according to one embodiment, two orthogonal vectors, but in some embodiments, the orthogonal vectors 114 may include two or more vectors where there are more than three stains in the original image 101.

The vector fitting module 304 takes the histogram 113 as an input. The vector fitting module 304 computes a fitness measure for candidate vectors from the identified plane 112 according to the following formula: $F = \Sigma \, counts[j] * [|a_1[j]|^q + |a_2[j]|^q]$ where j represents a point index corresponding to a plane with the candidate vectors as a basis and q is equal to 2. The summation for F is over the distinct colors identified in the histogram from 1 through k. $a_1[j]$ and $a_2[j]$ are the scalar terms representing the $j^{th}$ distinct color using candidate color vectors $v_1$ and $v_2$, which are rotated versions of the original va and vb vectors identifying the plane 112. The vectors with the smallest fitness measure F are chosen as the final stain vectors 116 used to determine the isolated one or more stain images.

Optionally, optimizations can be applied to the final vectors, such as performing a coarse search over the pairs of candidate vectors for rotations between 0 degrees and 90 degrees with 10 degree increments. Once the coarse search is complete, a refined search is performed near the best pair of candidate vectors found to fit the ODI data points. The performed searches result in the vectors obtained from principle component analysis being rotated so that the vectors form a right fit to the data in the histogram.

Figure 5:
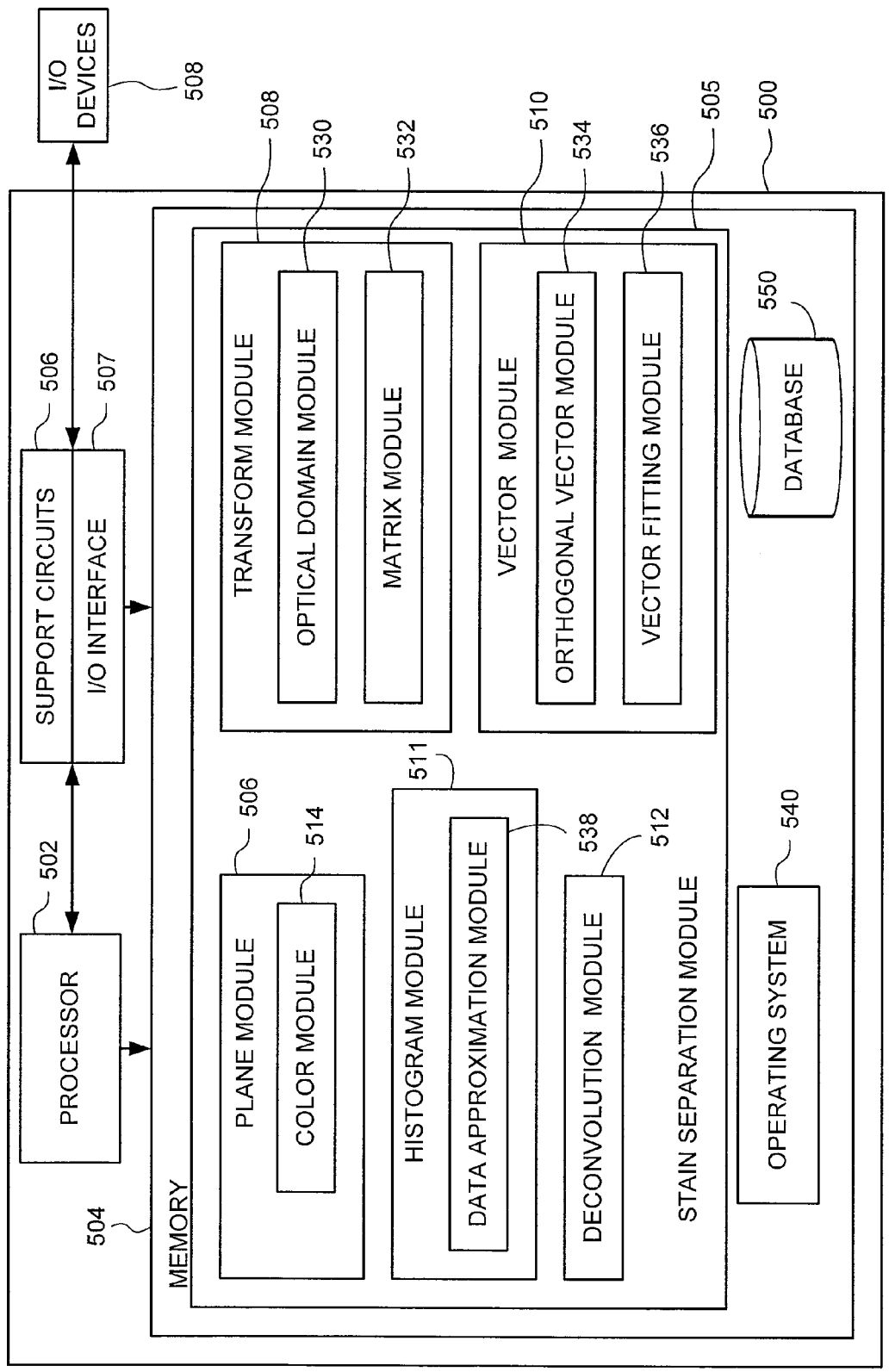
FIG. 5 is a block diagram of a computer system for implementing the stain separation apparatus in accordance with embodiments of the present invention.

FIG. 5 is a block diagram of a computer system 500 for implementing the stain separation apparatus 100 in accordance with exemplary embodiments of the present invention. The computer system 500 includes a processor 502, a memory 504 and various support circuits 506. The processor 502 may include one or more microprocessors known in the art, and/or dedicated function processors such as field programmable gate arrays programmed to perform dedicated processing functions. The support circuits 506 for the processor 502 include microcontrollers, application specific integrated circuits (ASIC), cache, power supplies, clock circuits, data registers, input/output (I/O) interface 507, and the like. The I/O interface 507 may be directly coupled to the memory 504 or coupled through the supporting circuits 506. The I/O interface 507 may also be configured for communication with input devices and/or output devices, such as, network devices, various storage devices, mouse, keyboard, displays, sensors and the like.

The memory 504 stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise the stain separation module 505, further comprising the plane module 506, the transform module 508, the vector module 510, the histogram module 511 and the deconvolution module 512. The memory 504 also comprises a database 550.

The plane module further comprises color module 514 and user selection module 516. The transform module 508 comprises the optical domain module 530 and the matrix module 532. The vector module 510 further comprises the orthogonal vector module 534 and the vector fitting module 536. The computer 500 may be programmed with one or more operating systems (generally referred to as operating system (OS) 540), which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 540 may be disposed in the memory 504. In an exemplary embodiment, the memory 504 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 6:
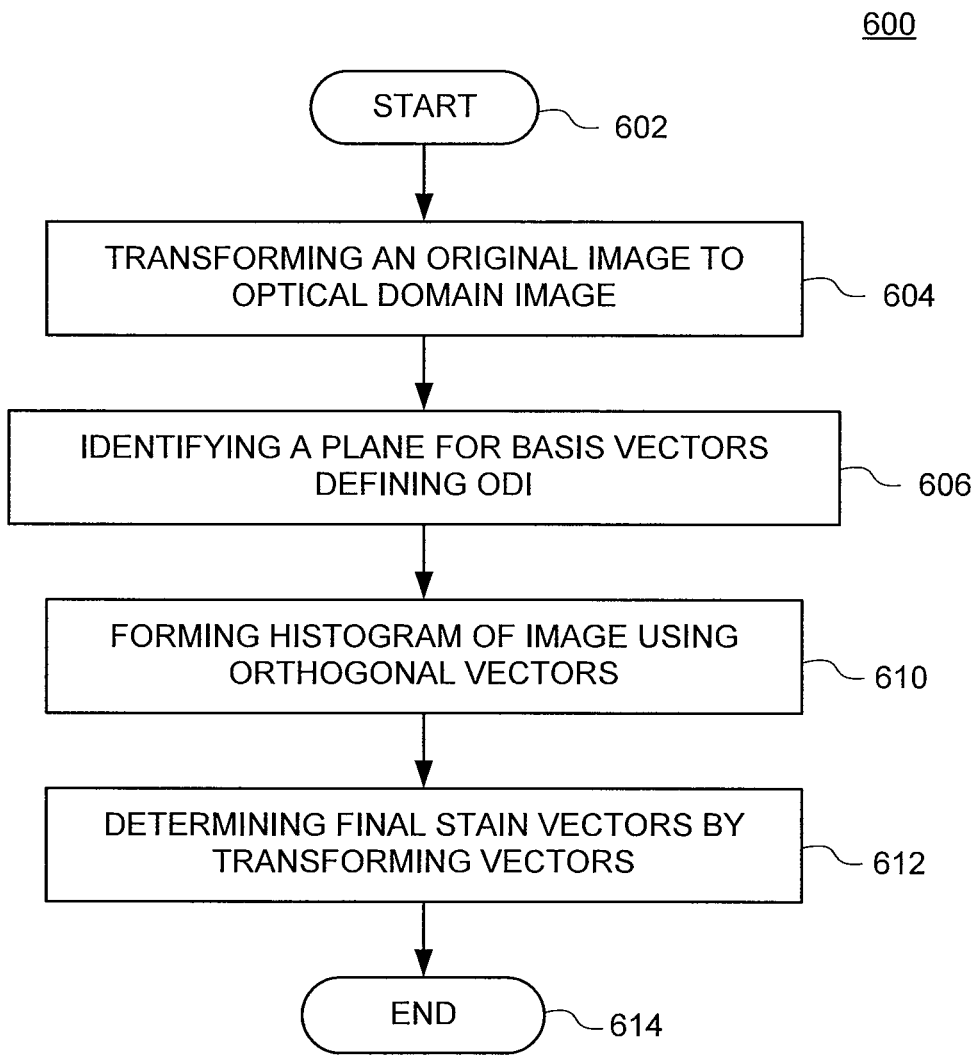
FIG. 6 is a flow diagram of a method for stain separation in accordance with embodiments of the present invention.

FIG. 6 is a flow diagram of a method 600 for stain separation in accordance with embodiments of the present invention. The method 600 is an exemplary implementation of the stain separation module 505 as executed by the processor 502.

The method begins at step 602 and proceeds to step 604. At step 604, the transform module 508 transforms the original image to an ODI as described above with respect to FIG. 2. According to one embodiment, the optical domain transformation transforms RGB images by computing, for each pixel, the optical domain vector using expression $R_{od} = -\log_{10}(R/R_0)$, where R could be the Red, Green or Blue value in RGB domain from 0 to 255 and $R_0$ is the white value of the background of the original image.

The method then proceeds to step 606 where the plane module identifies a plane for basis vectors defined by the data points of the ODI.

At step 610, the histogram module 511 forms a histogram of the data points from the optical domain image using the orthogonal vectors from the vector module 510. The orthogonal vectors are not an exact "fit" for the data in the ODI, however, so the method moves to step 612, where the vectors are transformed to obtain tight fit vectors as the final stain vectors. The method ends at step 614.

Figure 7:
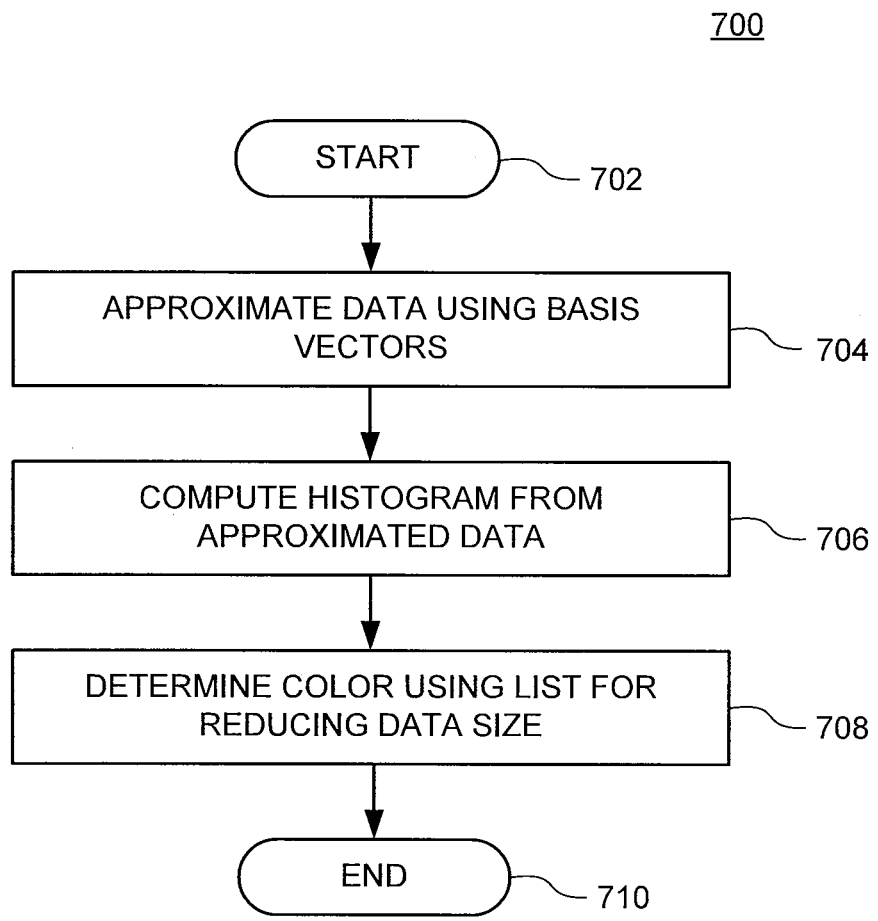
FIG. 7 is a flow diagram of a method for determining stain vectors in accordance with embodiments of the present invention.

FIG. 7 is a flow diagram of a method 700 for determining stain vectors in accordance with embodiments of the present invention. The method 700 is an exemplary implementation of the color module 514 and the data approximation module 538 as executed by the processor 502.

The method begins at step 702 and proceeds to step 704. At step 704, the data approximation module 538 approximates the ODI using the basis vectors from the vector module. The data approximation module 120 first approximates the ODI image data points where a vector $[R_{OD}(x,y), G_{OD}(x,y) B_{OD}(x,y)] \approx a_1(x,y) \, v_a + a_2(x,y) \, v_b$. Here, $a_1$ and $a_2$ represent, respectively, the stain amounts of stain 1 and stain 2.

The method then proceeds to step 706 where the histogram module 511 computes a histogram from the approximated data. According to one embodiment of the present invention, the histogram module 511 forms a two-dimensional (2D) joint histogram H(m,n), such that H(m,n) represents the number of times that $a_1(x,y)=m$ and $a_2(x,y)=n$. In this embodiment, the histogram has 256×256 bins, though in other embodiments, a three-dimensional histogram may also be used corresponding to the number of stains to the original image.

The method then proceeds to step 708, where the color module 514 determines the number of unique colors in the histogram constrained by the orthogonal vectors to reduce the number of data points in consideration. The method ends at step 710.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer-implemented method for stain separation comprising:
   transforming a digital image from a first color domain to an optical domain to form an optical domain image (ODI);
   identifying a plane containing two or more basis vectors which contain pixels of the ODI;
   forming a histogram of the digital image represented by the two or more basis vectors; and
   determining one or more final stain vectors by searching for candidate vectors in the plane that minimize a cost function of the histogram.

2. The method of claim 1 wherein identifying a plane further comprises:
   performing a matrix operation on the ODI to determine the two or more basis vectors and a residual vector.

3. The method of claim 2 wherein the matrix operation is one of principal component analysis, Karhunen-Loeve transform or singular value decomposition.

4. The method of claim 2 further comprising rotating the two or more basis vectors while remaining within the plane until a sum of squares of negative components of the basis vectors are minimized.

5. The method of claim 1 wherein forming the histogram further comprises:
   approximating data from the ODI wherein the one or more basis vectors are a first ($v_a$) and second vector ($v_b$) in the form: $a_1(x,y) V_a + a_2(x,y) V_b$; and
   computing a joint two-dimensional (2d) histogram H(m, n), such that H(m,n) represents a number of times that $a_1(x,y)=m$ and $a_2(x,y)=n$.

6. The method of claim 5 wherein the histogram is composed of 256 bins by 256 bins.

7. The method of claim 5 further comprising:
   determining a number of unique colors within the plane formed by the basis vectors by using a list representation for reducing a number of required data points.

8. The method of claim 1 wherein determining one or more final stain vectors further comprises:
   computing a fitness measure for each of the candidate vectors; and
   determining one or more stain vectors with a smallest computed fitness measure.

9. The method of claim 8 wherein the fitness measure F is determined according to: $F=\Sigma \text{ counts}[j]*[|a_1[j]|^q+|a_2[j]|^q]$ where j represents a point index corresponding to a plane with the candidate vectors as a basis for the plane and q is equal to 2.

10. The method of claim 1 wherein determining one or more final stain vectors further comprises:
    performing a coarse search over the candidate vectors for rotations of the two or more basis vectors between zero degrees and ninety degrees with a ten degree increment; and
    performing a fine search over a best pair of vectors from the candidate vectors for determining the one or more stain vectors.

11. The method of claim 1 wherein there are three or more stain vectors and the histogram is a three-dimensional (3D) histogram.

12. An apparatus for stain separation comprising:
    a transform module for transforming a digital image from a first color domain to an optical domain to form an optical domain image (ODI);
    a plane module, coupled to the transform module, for identifying a plane containing two or more basis vectors which contain pixels of the ODI;
    a histogram module, coupled to the plane module, for forming a histogram of the digital image represented by the two or more basis vectors; and
    a vector module for determining one or more stain vectors by searching for candidate vectors in the plane that minimize a cost function of the histogram.

13. The apparatus of claim 12 wherein plane module further comprises:
    a matrix module for performing a matrix operation on the ODI to determine the one or more basis vectors and a residual vector.

14. The apparatus of claim 13 wherein the matrix module further comprises rotating the one or more basis vectors while remaining within the plane until a sum of squares of negative components of the basis vectors are minimized.

15. The apparatus of claim 12 wherein the histogram module further comprises:
    a data approximation module for approximating data from the ODI wherein the one or more basis vectors are a first ($v_a$) and second vector ($v_b$) in the form: $a_1(x,y) V_a + a_2(x,y) V_b$, and
    computing a joint two-dimensional (2d) histogram H(m, n), such that H(m,n) represents a number of times that $a_1(x,y)=m$ and $a_2(x,y)=n$.

16. The apparatus of claim 15 wherein the histogram is composed of 256 bins by 256 bins.

17. The apparatus of claim 15 wherein the plane module further comprises:
    a color module for determining a number of unique colors within the plane formed by the basis vectors by using a list representation for reducing a number of required data points.

18. The apparatus of claim 12 wherein determining one or more stain vectors further comprises:
    computing a fitness measure for each of the candidate vectors; and
    determining one or more final stain vectors with a smallest computed fitness measure.

19. The apparatus of claim 18 wherein the fitness measure F is determined according to: $F=\Sigma \text{ counts}[j]*[|a_1[j]|^q+|a_2[j]|^q]$ where j is a point index corresponding to a plane with the candidate vectors as a basis for the plane and q is equal to 2.

20. The apparatus of claim 12 wherein determining one or more final stain vectors further comprises:
    a search module for performing a coarse search over the candidate vectors for rotations of the two or more basis vectors between zero degrees and ninety degrees with a ten degree increment, and performing a fine search over a best pair of vectors from the candidate vectors for determining the one or more stain vectors.

* * * * *